(12) United States Patent
Schuster et al.

(10) Patent No.: US 10,967,274 B1
(45) Date of Patent: Apr. 6, 2021

(54) DYNAMIC MANAGEMENT OF PROCESSES EXECUTING ON COMPUTING INSTANCES

(71) Applicant: Amazon Technologies, Inc., Seattle, WA (US)

(72) Inventors: Brian J Schuster, Seattle, WA (US); Justin Miles, Redmond, WA (US); Jonathan Robert Bush, Olalla, WA (US); Alexis Levasseur, Seattle, WA (US); Bruce Erwin Brown, Burien, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/351,874

(22) Filed: Mar. 13, 2019

(51) Int. Cl.
*A63F 13/77* (2014.01)
*G06F 9/455* (2018.01)
*H04L 12/24* (2006.01)
*G06F 9/38* (2018.01)

(52) U.S. Cl.
CPC ............... *A63F 13/77* (2014.09); *G06F 9/38* (2013.01); *G06F 9/45558* (2013.01); *H04L 41/5009* (2013.01); *G06F 2009/45575* (2013.01); *G06F 2009/45591* (2013.01)

(58) Field of Classification Search
None
See application file for complete search history.

(56) References Cited

U.S. PATENT DOCUMENTS

| 8,276,140 B1 * | 9/2012 | Beda, III | G06F 9/5077 709/224 |
| 8,352,608 B1 * | 1/2013 | Keagy | G06F 8/63 709/226 |
| 10,063,644 B1 * | 8/2018 | Pai | H04L 67/26 |
| 10,635,997 B1 * | 4/2020 | Roth | G06F 9/455 |
| 2009/0276771 A1 * | 11/2009 | Nickolov | H04L 67/1014 717/177 |
| 2010/0138688 A1 * | 6/2010 | Sykes | H04L 41/147 714/4.1 |
| 2012/0331127 A1 * | 12/2012 | Wang | G06F 9/4862 709/224 |
| 2013/0198319 A1 * | 8/2013 | Shen | G06F 9/455 709/217 |
| 2014/0089917 A1 * | 3/2014 | Attalla | G06F 9/5077 718/1 |

(Continued)

*Primary Examiner* — Seng H Lim
(74) *Attorney, Agent, or Firm* — Lee & Hayes, P.C.

(57) ABSTRACT

This disclosure describes techniques for a game-hosting service of a service provider network to dynamically determine a number of processes that are permitted to concurrently execute on an instance based on health values that indicate performances of the processes running on the instance. The game-hosting service may periodically or continuously receive health values from the instance, or multiple instances in a fleet of instances, and determine whether additional processes may be permitted to run, or if less processes may be permitted to run, on the instance based on the performance of the processes that are concurrently running on the instance. In this way, instances may dynamically be permitted to concurrently execute additional processes, or less processes, to help ensure that computing resources are being efficiently utilized, but also while maintaining acceptable performance for processes (e.g., game sessions) that are hosted on the instances.

18 Claims, 11 Drawing Sheets

(56) References Cited

U.S. PATENT DOCUMENTS

| | | | |
|---|---|---|---|
| 2014/0282453 A1* | 9/2014 | O'Rourke | G06F 8/42 |
| | | | 717/154 |
| 2014/0325070 A1* | 10/2014 | Philip | H04L 63/14 |
| | | | 709/226 |
| 2015/0126282 A1* | 5/2015 | Hitomi | A63F 13/355 |
| | | | 463/42 |
| 2017/0322929 A1* | 11/2017 | Hussain | G06F 9/45558 |
| 2018/0284986 A1* | 10/2018 | Bhagi | G06F 3/0664 |
| 2018/0367622 A1* | 12/2018 | Pai | H04L 67/26 |

\* cited by examiner

400

CREATE FLEET – DEVELOPER INTERFACE

402 — Fleet Details:

Create and configure a fleet of computing resources to host a game build. You can create a fleet for any game build that has been successfully uploaded to the game-hosting service.

| | |
|---:|:---|
| Name | RTS_Fleet1_AOE |
| Description | Real Time Strategy – On-Demand Fleet |
| Fleet type | On-Demand ▼ |
| 404 — Metric group | Frames Per Second (FPS) ▼ |
| 406 — Health metric min | 20 FPS |
| Build | Test_Build: RTSGameBuild v.1 2018-02-02 |
| Operating system | Default Operating System |
| Build ID | Build-b1e37015-54gd-2354-3v44-df2gds445532 |
| 408 — Additional metric group (optional) | Memory availability ▼ |
| 410 — Health metric min | 20 percent |

Save

DYNAMIC MANAGEMENT OF PROCESSES EXECUTING ON COMPUTING INSTANCES

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide users with on-demand delivery of compute power, database storage, applications, and other resources, rather than the users having to make upfront investments in hardware and spend time and resources managing the hardware.

Often, users that subscribe to the service provider for use of computing resources in the service provider network also provide products or services to their own clients. In such examples, the computing needs of the subscribers may dynamically scale based on a time of day when their clients are active. For example, the service provider network may provide a game-hosting service to game developers that deploys, operates, and scales session-based game servers in the service provider network for clients of the game developers. In this way, a game developer that has developed an online game may host their session-based, online game using virtual machine (VM) instances running on servers of the service provider network that are accessible by clients of the game developer.

For some online games, these VM instances are able to simultaneously host multiple game sessions of the online game, which can improve the utilization of the underlying hardware resources by these VM instances. However, as the amount of underlying computing resources required to host game sessions varies, the VM instances may not effectively utilize the computing resources resulting in inefficient computing resource utilization.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a graphical user interface by which a game developer can specify parameters for a fleet of instances that support a game build.

DETAILED DESCRIPTION

Figure 1:
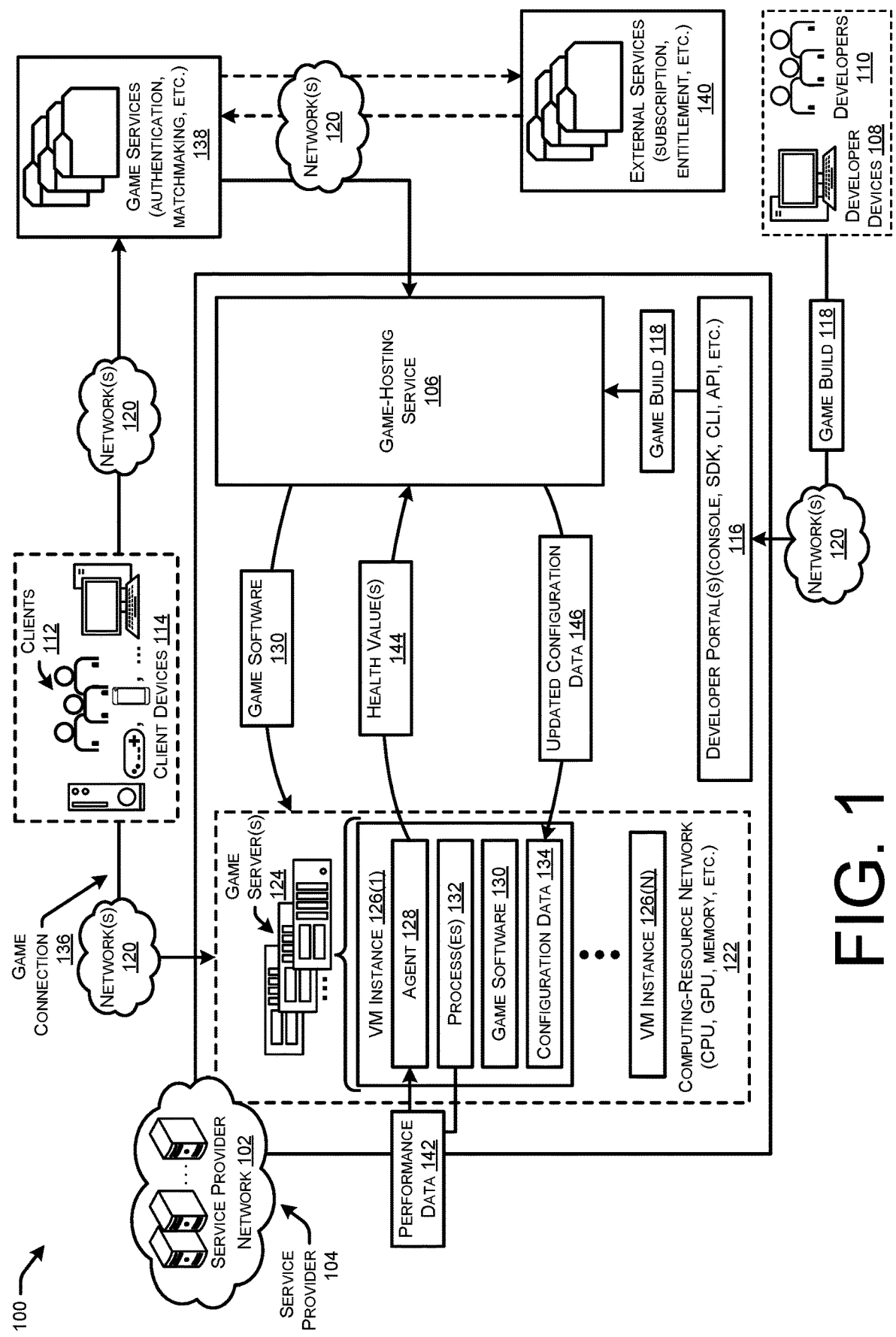
FIG. 1 illustrates a system-architecture diagram of an example environment in which a game-hosting service of a service provider network dynamically modifies the number of processes that are permitted to concurrently execute on an instance.

Service providers offer various network-based (or "cloud-based") services to users to fulfill computing needs of the users. These service providers may operate service provider networks that include clusters of managed servers stored in data centers located across different geographic regions. In this way, users who have subscribed for use of the network-based services (or "subscribers) need not invest in and maintain the computing infrastructure required to implement the various services that they may need. Additionally, subscribers and their clients are able to access these network-based services over different geographic regions. To offer these network-based services across geographic areas, service providers operate and maintain service provider networks (e.g., cloud-based computing environments, network-based service architectures, network-based service infrastructures, etc.). In this way, service provider networks may provide subscribers with scalable, on-demand, and network-accessible computing platforms over large geographic regions such that the subscribers have readily-available VM instances at their disposal. These service provider networks allow subscribers to immediately have computing infrastructure over large geographic regions to fulfil individual computing needs of the subscriber, and also to provide computing resources to support services provided to clients of the subscribers.

For example, a subscriber to the service provider network may be a game developer (e.g., individual, company, and/or other organization) that has developed an online game that they would like to provide to clients who desire to play the online game. However, the game developer may desire to provide access to their online game to clients over large geographic regions, and for large amounts of users. The amount of computing infrastructure (e.g., compute power, memory, storage networking, security, etc.) used to support and maintain an online gaming platform over different geographic regions that hosts game sessions for clients may be large enough to be impractical for game developers, particularly new or emerging game developers, to purchase and maintain on their own.

Accordingly, service provider networks may provide a game-hosting service that is a fully, or at least partially, managed online gaming platform. The game-hosting service may deploy, operate, and scale session-based online game servers in the service provider network on behalf of game developers. The game-hosting service may provide groups, or "fleets," of virtual machine instances (e.g., VM instances, instances, etc.) that run on computing resources of the service provider network and host game sessions for clients of a subscribing game developer. Depending on how many clients are requesting and engaged in online game sessions, the game-hosting service may spin up, or spin down, VM instances on behalf of the game developer to host an appropriate number of game sessions. Depending on the size of the game, complexity of the game, number of clients engaged in a single game session, and/or other factors, each VM instance may be able to run multiple game sessions of the online game for clients of the developer. While it is advantageous to more efficiently utilize VM instances and underlying hardware resources by running multiple game sessions on a single VM instance, game performance for the game sessions can deteriorate if the VM instances and/or the underlying hardware resources are overutilized, which can reduce the user experience and satisfaction of clients involved in the game sessions. For example, game sessions may experience reduced frame rate, increased latency, and/or time out altogether when VM instances and/or the underlying computing resources are overleveraged, thereby reducing the user experience of clients which may cause clients to quit playing the online game. In particular, in some instances, the deterioration of the game performance may not be readily detectable based on a measure of the underlying hardware resources. In such instances it may be desirable to utilize instance level metrics to determine how well the underlying hardware resources are being utilized.

This disclosure describes, at least in part, techniques and technologies implemented by a game-hosting service of a service provider network to dynamically determine a number of processes that are permitted to concurrently execute on an instance based on performance metrics or health values that indicate performances of the processes running on the instance. The game-hosting service may periodically or continuously receive health values from the instance, or multiple instances in a fleet, and determine whether additional processes may be permitted to run, or if fewer processes may be permitted to run, on the instance based on the performance of the processes that are concurrently running on the instance. In this way, instances may dynamically be permitted to concurrently execute additional processes, or fewer processes, to help ensure that computing resources are being efficiently utilized, but also while maintaining acceptable performance for processes (e.g., game sessions) that are hosted on the instances.

To utilize the game-hosting service provided by the service provider network, a game developer that has developed an online game may subscribe (e.g., create a user account) to the game-hosting service and provide a game build for their online game. The game build may include the game software that is to run on the instances, server executables, supporting assets, libraries, and dependencies. The game developer may create the game build and upload the game build through a portal provided by the service provider network. The game developer may then be provided with additional options regarding their online game, such as how many instances they would like to have readily available to spin up to run their game software to host game sessions between clients. Generally, a game session is an instance of the game software running on a server that clients (or "players") can connect to and interact with. The game defines the basic characteristics of the game session, such as the life span or the number of players involved.

In some examples, the game-hosting service may additionally receive configuration data from the game developer that indicates runtime configurations regarding how many processes may execute on each VM instance. Generally, one process (or "server process") may support one game session. However, in some examples, a server process may support multiple game sessions, and/or other processes that execute to help manage the VM instance and/or game session. The game developer may select a type of VM instance that they would like to have their game session hosted on, and provide configuration data that indicates how many processes the VM instance should run at a time (or concurrently), and/or how many workloads each process can handle. For instance, a VM instance may have preconfigured capacity, such as allocated amounts of computer power, memory, bandwidth, and/or other computing resource capacity. The game developer may provide the initial configuration data that specifies the maximum amount of processes that are permitted to execute concurrently on each VM instance.

To determine how many processes to allow to execute concurrently on a VM instance, a game developer may have to perform manual calculations based on the preconfigured computing resource capacity for the VM instance, and/or perform trial-and-error testing with their game software on the instance. However, performing these manual calculations and/or doing trial-and-error may be time consuming, resource intensive, inaccurate, and difficult to optimize. Additionally, the amount of resources used by a game session, or other server process, may vary overtime based on various factors, such as number of players in a game session, amount of data being loaded for the game session, and so forth.

As an example, a game developer may have developed an online real-time strategy (RTS) game where players engaged in the RTS game may build, position, and maneuver units and structures under their control to different areas of a map and attempt to destroy their opponents' assets. In such an example, the amount of resources consumed by a server process that is hosting the game session may vary based on factors such as the number of players and/or size of the map. For instance, a larger game session where eight players are playing on a larger map may consume more resources than a smaller game session where two players are playing on a smaller map. Further to this example, the initial configuration data provided by the game developer may specify that the maximum number of processes that are permitted to execute concurrently on an instance is 30 processes. In such examples, if a VM instance is running 30 processes that are hosting smaller game sessions, the VM instance may have sufficient computing resources to support the smaller game sessions such that clients engaged in the game sessions have good user experience (e.g., low latency, high frames per second, etc.). However, if a VM instance is instead running 30 processes that are hosting larger game sessions, the VM instance may not have sufficient computing resources to support the larger game sessions to provide the clients with good user experience (e.g., high latency, low frames per second, time outs, etc.).

Additionally, as game software changes over time, the initial configuration data that specifies the maximum number of processes permitted to execute concurrently may cause additional issues. For example, the game developer may periodically provide software updates to their game software, such as software patches, software updates (e.g., new game styles, new maps, etc.), new software versions, and/or other updates and changes. The game software may begin to require more, or less, computing resources when executing on the VM instances. In such examples, the number of processes specified in the initial configuration data may be inappropriate for the updated game software, such as by allowing too many processes to run, or too few processes to run, resulting in either overutilization or underutilization of resources. Thus, it may be disadvantageous for various reasons to have game developers manually determine their configuration data, and also to continue to use the same configuration data over time as the amount of resources consumed by server processes may change.

The techniques described herein include collecting resource utilization data, such as performance metrics or health values, that indicate the performances of processes running on the instance and/or the amount of resources being consumed by the instance. In some examples, a software agent (e.g., script, program, application, etc.) may be deployed to a VM instance to collect and/or determine the health values for one or more processes running on the VM instance. For instance, the agent may determine, for a process running on the instance, a current frame rate of the CPU and/or GPU hosting the game session (e.g., 20 fps, 40 fps, 60 fps, etc.), a percentage and/or amount of memory of the instance being utilized by one or all of the processes, a percentage and/or amount of compute power of the instance being utilized by one or all of the processes, an amount of network bandwidth being utilized by a process, and/or any other data indicative of, or affecting, performance of the game session(s). The agent may continuously, periodically, and/or based on a predefined event, collect the data and/or health values and provide the health values to the game-hosting service.

The game-hosting service may be a centralized server or cluster of servers configured to receive health values from agents running on individual VM instances of a fleet of VM instances that host game sessions for the game developer. The game-hosting service may analyze the health values and determine if new configuration data should be generated for the VM instances. For example, the game-hosting service may have one or more threshold values indicating healthy processes, or unhealthy processes, that may be received from the game developer and/or determined by the service provider. The game-hosting service may have a minimum threshold value that indicates a performance metric they would not like their processes to drop below. As an example, the game developer may provide the minimum threshold value that indicates the server processes are not to drop below 30 fps for a game session. The game-hosting service may receive a health value indicating that one or more processes running on the VM instance have a frame rate of 25 fps, and thus too many processes are running on the VM instance. The game-hosting service may then generate updated configuration data that specifies a reduction in the maximum number of processes that are permitted to execute on the VM instance, and provide the updated configuration data to one or more VM instances in the fleet of instances.

In other examples, the game developer and/or the game-hosting service itself may also specify a maximum threshold value that specifies a health value indicative of underutilization of the computing resources of the VM instance. For example, if the health value for the one or more processes running on the VM instance is greater than the maximum threshold value of 60 fps, then the VM instance may be capable of executing additional processes simultaneously without having performance of the game sessions fall to unacceptable levels. In such examples, the game-hosting service may generate updated configuration data that specifies an increase to the number of processes permitted to simultaneously execute on the VM instance, and provide the updated configuration data to one or more VM instances in the fleet of instances. The VM instance may then begin to execute additional processes and/or workloads as permitted by the updated configuration data.

In this way, the game-hosting service may dynamically adjust the number of processes that a VM instance, and/or a fleet of VM instances, are permitted to concurrently execute based on the performance or health of the processes currently running on the VM instance, and/or fleet of VM instances. This may allow the game-hosting service to prevent overutilization and underutilization of resources such that the resources supporting the VM instance are more effectively utilized compared to compared to existing techniques. For instance, the number of concurrently executing processes on an instance may be scaled down to ensure good or healthy performance of a game session, and/or scaled up when resources are being underutilized. In some examples, by allowing more processes to run concurrently, the number of VM instances in the fleet of instances may be reduced, which conserves computing resources. For example, VM instances in the fleet and their underlying hardware may be spun down or otherwise deactivated due to the operating VM instance executing additional processes, without causing poor performance of the processes. Thus, the advantages of having adequate game session performance may be maintained, and the disadvantages of underutilization of computing resources and/or overutilization of computing resources are avoided using the techniques described herein.

In some instances, the techniques may be performed using a single agent executing on a single VM instance, or by agents installed on each VM instance in a fleet of instances. For example, the game-hosting service may provision or dedicate a fleet of instances to execute one or more processes that host one or more game sessions each for clients of the game developer. In some instances, the fleet of VM instances may all host the same game software. In examples where each VM instance has an agent executing thereon, the agents may continuously, or periodically, provide health values to the server(s) of the centralized game-hosting service to analyze the health values. The game-hosting service may generate configuration data for each of the instances as described above. In some examples, the game-hosting service may determine the number of processes that each instance in the fleet is permitted to execute based on health values for one or more of the instances within the fleet. For example, a single instance may be utilized to determine the maximum number of processes permitted to execute on each instance in the fleet. The game-hosting service may generate configuration data based on health values for that instance, and provide that configuration data to all of the instances in the fleet for future use. In other examples, individual instances in the fleet may each have individualized configuration data generated such that the instances may be permitted to execute different numbers of concurrent processes based on the individual health values for the instances.

Although the techniques described herein are with reference to a game-hosting service and VM instances that execute game software to host game sessions, the techniques are equally applicable to other software programs. For instance, the techniques may be applied to a software-management system that executes software for employees of an organization. In such examples, the software-management system may similarly experience upswings and downswings in computing resources needs based on the employee work schedule. Additionally, the employees may execute different software programs, or have different amounts of data being processes by software programs, such that similar performance and scaling issues may arise as those in the gaming industry.

While some of the techniques are described as being performed at one or more servers that are remote or separate from the VM instances, in some examples the techniques may be performed locally at the VM instances, such as by the agent. For instance, the agents that run locally on the VM instances may analyze the health values and generate new configuration data for the instances to adjust the number of processes that are permitted to concurrently execute on the instances. Additionally, while the techniques are described as being performed in a service provider network of a service provider, the techniques may similarly be applied in other computing networks, such as on-premise servers managed by the game developers themselves.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a game-hosting service of a service provider network 102 dynamically modifies the number of processes that are permitted to concurrently execute on an instance.

As illustrated, the service provider network 102 may be operated and/or managed by a service provider 104. The service provider network 102 may provide various services to users to fulfil their computing resource needs, such as cloud-based computing resources. For example, the service provider network 102 may provide cloud-based, scalable, and network accessible compute power services, storage services, database services, and/or other services. As illustrated, the service provider network may also provide a game-hosting service 106 that is a scalable, cloud-based runtime environment for online games, including session-based multiplayer games. The game-hosting service 106 may be fully managed by the service provider 104 and deploy, operate, and scale the session-based multiplayer game servers in the cloud-based, or network-based, environment. For example, the game-hosting service 106 may not only provide the hardware to host the game sessions, but also manage ongoing activity, security, storage, and performance tracking. Additionally, the game-hosting service 106 may provide auto-scaling capabilities such that instances supporting game sessions can be spun up or spun down based on player demand.

To utilize the game-hosting service 106, developers 110 may utilize developer devices 108 to register for an account with the game-hosting service 106. This may allow the developers 110 to provide their clients 112 with access to an online game via their client devices 114 without the developers 110 having to invest in the computing resources (e.g., on-premise resources) needed to host the online game sessions for their clients 112. In order to utilize the game-hosting service 106, the developers 110 may provide a game build 118 to the game-hosting service 106 via one or more developer portals 116. The developer portal(s) 116 may include one or more of a web-based console, a software-development kit (SDK), a command-line interface (CLI), an application programming interface (API), and/or any other means by which a developer 110 may specify and/or provide a game build 118 to the game-hosting service 106.

The game build 118 may correspond to any type of online game that may host a game session for one or more clients 112 (or "players"). For instance, the game build 118 may correspond to a session-based single player online game, or a session-based multiplayer online game. The game build may represent any type of online game, such as real-time strategy (RTS) games, first person shooter (FPS) games, multiplayer online battle arena (MOBA) games, role playing (RPG) games, massively multiplayer online (MMO) games, massively multiplayer online role player games (MMORPG), virtual board games (e.g., chess, checkers, etc.), action-adventure games, simulation games, strategy games, sports games, virtual reality games, and/or any other game that may be played in an online environment.

Generally, the client devices 114 may comprise any type of computing device that may be utilized for online gaming. For instance, the client devices 114 may include laptop computing devices, desktop computing devices, mobile phones, gaming systems, controller-based devices, virtual and/or augmented reality devices, wearable devices, biometric sensors, projectors, televisions, and/or any computing device usable on its own, or in conjunction with other devices, for online gaming. In some examples, at least part of the online game may execute and/or be stored locally on the client devices 114.

The game build 118 may include the game software for the online game, and may further include server executables, supporting assets, libraries, and dependencies that are all used to host and/or execute the game software on an instance. The developers 110 may provide the game build 118 through the developer portal(s) 116, such as by uploading the game build 118 over one or more networks 120 (e.g., the Internet, WANs, PANs, LANs, etc.). The network(s) 120 may comprise any type of network or combination of network, including wired and/or wireless networks. Once a developer 110 has uploaded their game guild 118, the game-hosting service 106 may deploy the game software 130 to one or more game servers 124 in a computing-resource network 122. For instance, the game software 130 may be installed on one or more virtual machine (VM) instances 126 that are at least partially managed by a local agent 128 (e.g., script, program, etc.).

The computing-resource network 122 may include data centers that each include one or more computing resources, such as VM instances 126(1) to 126 (N) where "N" is any integer greater than 2 (referred to herein collectively as "VM instances 126" "or just "instances 126"). The data centers may house the game server(s) 124 and may be located across disparate geographical regions such that computing resources are available to support functionality for cloud-based services provided by the service provider network 102. The computing resources may include various combinations of hardware-based components, such as central processing units (CPU), graphics processing units (GPU), memory, storage, network capacity, security, and/or any other type of hardware-based resource to support cloud-based services, such as the game-hosting service 106. In some examples, the computing resource network 122 may further include respective memories that store various firmware-based and/or software-based resources that provide the functionality of the services, such as the instances 126 on which an agent 128 executes, the game software 130 executes, and one or more processes 132 execute to support a game session.

Generally, the agent 128 may be responsible for handling various processes on an instance 126, such as spinning up an instance 126, spinning down an instance 126, handling lifetime processes of the instance 126, retrieving pending game sessions from a queue to be executed on the instance 126, managing resources of the instance 126, installing patches and/or other software on the instance 126 and/or various other actions for managing the instance 126.

In some examples, each process 132 that executes on an instance 126 may support a game session that engages one or more clients via their client device(s) 114. That is, each process 132 may support one game session. For instance, the process(es) 132 may each be running the game software 130 to support a game session for one or more clients 112. However, in some examples and depending on the game, a process 132 may handle multiple game sessions, and/or perform other tasks besides hosting a game session to help manage game sessions, interact with client devices 114 and/or the game-hosting service 106, manage the instance 126, and/or perform other actions. The process(es) 132 may be binary processes 132, executable processes 132, etc., running on the VM instance 126 that consume or utilize the underlying hardware resources and/or other resources.

To play in a game session, the client devices 114 may interact directly with the game-hosting service 106, and/or through various backend game services to retrieve information on current game sessions, to request new game sessions, and/or reserve slots in game sessions. For instance, the client devices 114 may interact, over one or more networks 120, with game services 138 that may handle communication between client devices 114 and the game-hosting service 106. Further, the game services 138 may handle additional tasks or provide additional services, such as player authentication and authorizations, team building and matchmaking, and inventory control. For example, when a client 112 wants to join a game, the client device 114 may call the authentication service to first verify the client's 112 identity, and then send a player slot request to the game-hosting service 106.

In further examples, the online game of a developer 110 may rely on or utilize one or more additional external services 140, such as for validating a subscription membership and/or determining entitlements for a client's account. As shown, the information from the external services 140 may be passed to the game server(s) 124 via the game services 138 and the game-hosting service 106 without going through the client device(s) 114.

To establish or join a game session, clients 112 may utilize their client devices 114 (e.g., applications, software, or other programs executing thereon) to request (e.g., API call) that the game-hosting service 106 place them in a game session. The game-hosting service 106 may launch a server process 132 to host a game session, or identify an already running process 132 that is hosting a game session. Thus, the game-hosting service 106 may either identify an active game session that has an open player slot in the game session, or launch a new process 132 to host a game session for the requesting client device 114. After identifying an open player slot, the client application running on the client device 114 may create a game connection 136 by connecting directly, over the network(s) 120, to the open game server 124 using a player session ID. The server process 132 may then accept the player ID as a valid ID and accepts, or rejects, the game connection 136. If connected, the player session is set to active and the client 112 begins playing the game using their client device 114 and the game connection 136 that is established between the game server 124 that has the instance 126 with the process 132 executing to host the selection game session. Once a game session has ended (e.g., clients 112 quit, the game ends, time out, etc.), the client application on each of the involved client devices 114 may disconnect from the process 132, and the game-hosting service 106 can change the game session to terminated, upload a game session log to storage, and update a fleet utilization to indicate that the game server 124 has one less process executing 132. Underutilized game servers 124 may request additional game sessions if they are concurrently executing less than the specified number of processes 132 indicated in the configuration data 134.

Generally, the game-hosting service 106 may deploy a group of instances 126, often referred to as a "fleet" of instances 126, on game servers 124. In various examples, a fleet of instances 126 may all support the same game build 118, or the same online game. Each instance 126 in a fleet may run multiple processes 132 simultaneously, depending on the hardware capability, and each server process can host at least one game session. Since a game build 118 can have one or multiple executable files, a developer 110 and/or the service provider 104 may configure a fleet to run multiple server processes 132 of each executable on each instance 126.

In order to configure a fleet of instances 126 to run multiple processes 132 simultaneously or concurrently, the developer 110 and/or service provider 104 may generate configuration data that describes what processes 132 run on each instance 126 in a fleet. Each instance 126 in the fleet launches the server processes 132 specified in the configuration data 134 and launches new ones as existing processes 132 end. Each instance 126 may regularly check for updated configuration data 146 and follows the new instructions.

The configuration data 134 enables the instances 126 in a fleet to run multiple processes 132 simultaneously. Potential scenarios in which multiple processes 132 execute simultaneously may include (i) running multiple processes 132 of a single game software 130 to maximize usage of the computing resources, (ii) running one or more processes 132 of different game build 118 executables, such as the game software 130 executable and a related program, or two or more different versions of a game software 130, and/or (iii) running multiple processes 132 of the same game software 130 but with different launch parameters, for example to run one process 132 on each instance 126 in debug mode.

Often, a developer 110 would determine or calculate the total number of processes 132 specified in the configuration data 134 by, for example, adding values of a concurrent executions parameter for each process 132 object specified in the configuration data 134. The developer 110 would attempt to determine the right configuration data 134, or the appropriate maximum for processes 132 that may run simultaneously, in order to balance the computing requirements of the game build 118—and the number of processes 132 to run—against the capabilities of the instance 126 type selected. However, as noted above, this can be time consuming, difficult to optimize, and may experience inefficiencies when various parameters of a game session change (e.g., size of a map in a game session, number of players in a game session, etc.). Accordingly, the game-hosting service 106 may collect various data that generally indicates resource consumption and/or process performance for the processes 132 executing on instances(s) 126 and dynamically determine updated configuration data 146 to change the number of processes 132 that may execute simultaneously.

In some examples, the agent 128 on each instance 126 may collect or otherwise be provided with performance data 142 from one or more of the processes 132 executing on the instance 126. For example, the agent 128 may determine or receive, for a process 132 running on the instance 126, a current frame rate of the CPU and/or GPU hosting the game session (e.g., 20 FPS, 40 FPS, 60 FPS, etc.), a percentage and/or amount of memory of the instance 126 being utilized by one or all of the processes 132, a percentage and/or amount of compute power of the instance 126 being utilized by one or all of the processes 132, an amount of network bandwidth being utilized by a process 132, and/or any other data indicative of, or affecting, performance of the game session(s). The agent 128 may continuously, periodically, and/or based on a predefined event, collect the data and/or health values and provide the health values 144 to the game-hosting service 106.

The game-hosting service 106, which may comprise one or more centralized clusters of servers or computing devices, may receive the health value(s) 144 from one or more of the instances 126 in the fleet. The game-hosting service 106 may include one or more components configured to analyze the health values 144 and determine if updated configuration data 146 is to be generated for the VM instance(s) 126. For example, the game-hosting service 106 may have one or more threshold values indicating healthy processes 132, or unhealthy processes 132, that may be received from the game developer 110 and/or defined by the service provider 104. For instance, the game-hosting service 106 may have a minimum threshold value that indicates a performance metric, or health value 144, below which they would not want their processes 132 to drop. As an example, the game developer 110 may provide the minimum threshold value that indicates the server processes 132 are not to drop below 30 fps for a game session. The game-hosting service 106 may receive a health value 144 indicating that one or more processes 132 running on the VM instance 126 have a frame rate of 25 fps, and thus too many processes 132 are running on the VM instance 126 for the CPU/GPU to maintain/provide acceptable game performance. The game-hosting service 106 may then generate updated configuration data 146 that specifies that a lower number of processes 132 are permitted to execute on the VM instance 126 than the current configuration data 134, and provide the updated configuration data 146 to one or more VM instances 126 in the fleet of instances 126. In some instances, the health value 144 may be independent of whether the underlying hardware provides an indication that resources are strained (e.g., a maximum number of players per VM instance 126 regardless of performance).

In other examples, the game developer 110 and/or the game-hosting service 106 itself may also specify a maximum threshold value that specifies a health value 144 indicative of underutilization of the computing resources of the VM instance 126. For example, if the health value 144 for the one or more processes 132 running on the VM instance 126 is greater than the maximum threshold value of 60 fps, then the VM instance 126 may be capable of executing additional processes 132 simultaneously without having performance of the game sessions fall to unacceptable levels. In such examples, the game-hosting service 106 may generate updated configuration data 146 that specifies that a higher number of processes 132 are permitted to simultaneously execute on the VM instance 126 compared to the current configuration data 134, and provide the updated configuration data 146 to one or more VM instances 126 in the fleet of instances 126. The VM instance 126 may then begin to execute additional processes 132 and/or workloads as permitted by the updated configuration data 146.

In this way, the game-hosting service 106 may dynamically adjust the number of processes 132 that a VM instance 126, and/or a fleet of VM instances 126, are permitted to concurrently execute based on the performance or health of the processes 132 currently running. This may allow the game-hosting service 106 to prevent overutilization and underutilization of resources such that the resources supporting the VM instance 126 are more effectively utilized compared to manual, human-based techniques. For instance, the number of concurrently executing processes 132 on an instance 126 may be scaled down to ensure good or healthy performance of a game session, and/or scaled up when resources are being underutilized. In some examples, by allowing more processes 132 to run concurrently, the number of VM instances 126 in the fleet of instances 126 may be reduced, which conserves computing resources. For example, VM instances 126 in the fleet and their underlying hardware may be spun down or otherwise deactivated due to the operating VM instance 126 executing additional processes 132, without causing poor performance of the processes 132. Thus, the advantages of having adequate game session performance may be maintained, and the disadvantages of underutilization of computing resources and/or overutilization of computing resources avoided using the techniques described herein.

In some instances, the techniques may be performed using a single agent 128 executing on a single VM instance 126, or by agents 128 installed on each VM instance 126 in a fleet of instances 126. For example, the game-hosting service 106 may provision or dedicate a fleet of instances 126 to execute one or more processes 132 that host one or more game sessions each for the clients 112 of the game developer 110. In some instances, the fleet of VM instances 126 may all host the same game software 130. In examples where each VM instance 126 has an agent 128 executing thereon, the agents 128 may continuously, or periodically, provide health values 144 to the server(s) of the centralized game-hosting service 106 to analyze the health values. The game-hosting service 106 may generate updated configuration data 146 for each of the instances 126 as described above. In some examples, the game-hosting service 106 may determine the number of processes 132 that each instance 126 in the fleet is permitted to execute based on health values 144 for one or a few instances 126. For example, a single instance 126 may be utilized to determine the maximum number of processes 132 permitted to execute on each instance 126 in the fleet. The game-hosting service 106 may generate updated configuration data 146 based on health values 144 for that instance 126, and provide that updated configuration data 146 to all of the instances 126 in the fleet for future use. In other examples, individual instances 126 in the fleet may each have individualized updated configuration data 146 generated such that the instances 126 may be permitted to execute different numbers of concurrent processes 132 based on the individual health values 144 for the instances 126.

In some examples, the game-hosting service 106 may perform various operations for mitigating issues when VM instances 126 are concurrently executing too many processes 132. In some instances, the game-hosting service 106 may simply provide the updated configuration data 146 such that, as processes end organically (e.g., game sessions end), the VM instance 126 will refrain from requesting or executing additional processes 132. In other examples, the game-hosting service 106 may perform a more active management of processes 132 executing on the VM instances 126. For example, the game-hosting service 106 may cause "unhealthy" processes 132 to end or stop executing on the VM instance 126 so the total number of processes 132 fall below the permissible limit defined in the updated configuration data 146. The game-hosting service 106, and/or the agent 128, may cause one or more processes 132 with poor performance metrics (e.g., frame rate) to stop executing. In various examples, the game-hosting service 106 may migrate processes 132 from unhealthy instances 126 onto healthy instances 126. For example, the game-hosting service 106 may determine a state of a process 132 running on an instance 126 that has more than the permissible amount of processes 132 executing concurrently. The game-hosting service 106 may then migrate one or more processes 132 by sending the state of the process(es) 132 to begin executing on a healthier instance 126.

Figure 2:
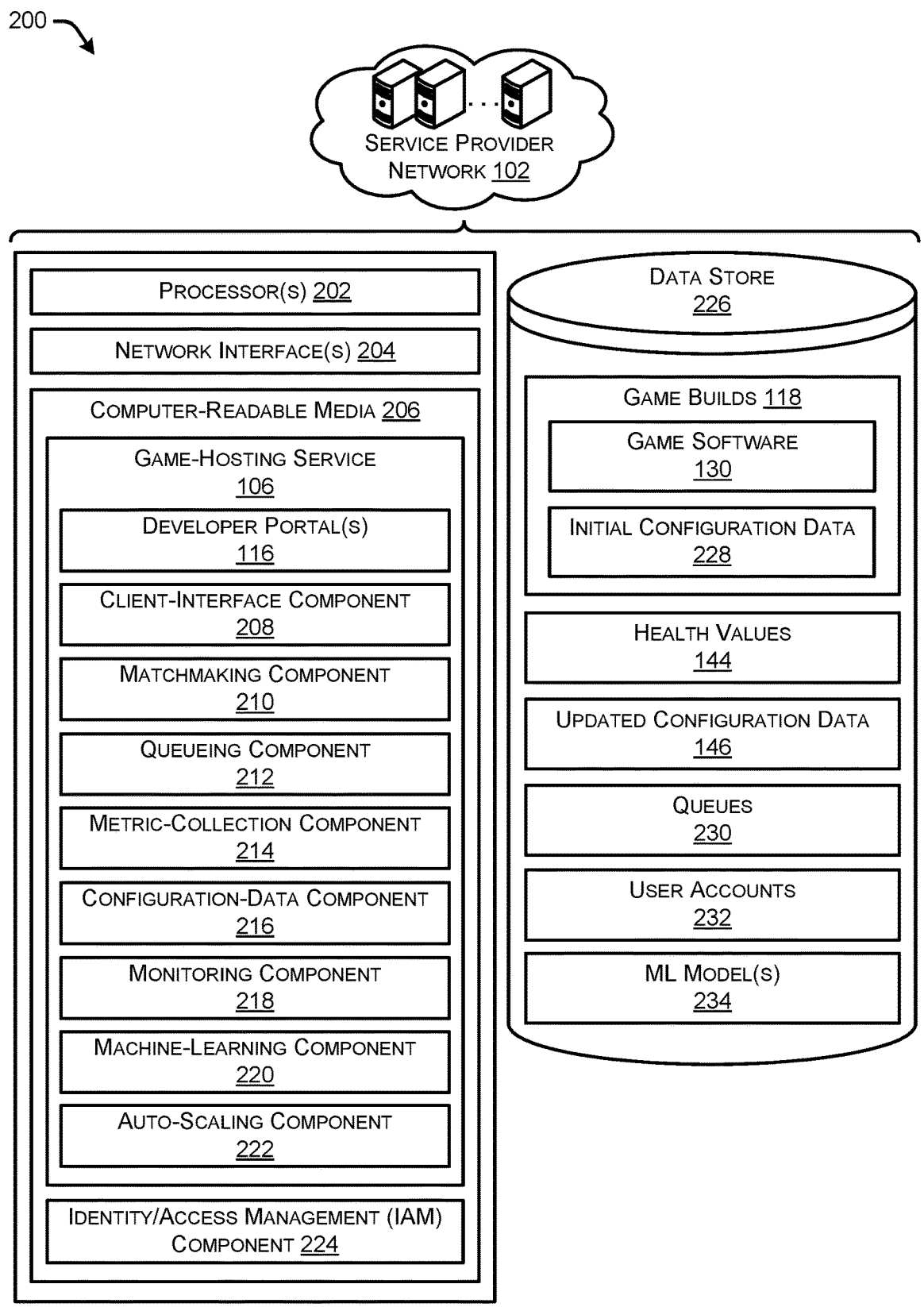
FIG. 2 illustrates a component diagram of an example service provider network that provides a game-hosting service that dynamically modifies the number of processes that are permitted to concurrently execute on an instance.

FIG. 2 illustrates a component diagram 200 of an example service provider network 102 that provides a game-hosting service 106 that dynamically modifies the number of processes 132 that are permitted to concurrently execute on an instance 126.

As illustrated, the service provider network 102 may include one or more hardware processors 202 (processors) configured to execute one or more stored instructions. The processor(s) 202 may comprise one or more cores. Further, the service provider network 102 may include one or more network interfaces 204 configured to provide communications between the service provider network 102 and other devices, such as the developer device(s) 108 and/or the client device(s) 114. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS® SERVER operating system from MICROSOFT Corporation of Redmond, Wash. According to further embodiments, the operating system(s) can comprise the UNIX operating system or one of its variants. It should be appreciated that other operating systems can also be utilized.

The computer-readable media 206 may store portions, or components, of the game-hosting service 106 described herein. For instance, the computer-readable media 206 may store the developer portal(s) 116 through which developer(s) 110 may provide their game builds 118, and/or other input for managing their online games. Additionally, the computer-readable media 206 may store a client-interface component 208 configured to provide portals, user interfaces, and/or other avenues through which clients 112 may interact with the online games hosted by the game-hosting service 102 and/or account settings for user accounts.

The computer-readable media 206 may further store a matchmaking component 210 configured to, when executed by the processor(s) 202, provide various matchmaking functionality for the game-hosting service 106. Generally, the matchmaking component 210 may include a customizable rules engine that allows developers 110 to design how to match clients 112 (or players) together based on player attributes and game modes that are appropriate for the online game. The matchmaking component 210 may further manage the details for forming player groups for game sessions, and placing the player groups into active or recently created/initiated game sessions.

The computer-readable media 206 may further store a queueing component 212 configured to, when executed by the processor(s) 202, manage queues for placing new game sessions with appropriate or available hosting resources (e.g., instances 126) across fleets and/or geographic regions. Generally, the matchmaking component 210 builds on the queueing component 212 because, once a match is created, the matchmaking component 210 may hand or send the match details to a queue that is managed by the queueing component 212. The queueing component 212 may then search for available hosting resources in the fleet of instances 126 and starts a new game session for the players in the match.

The computer-readable media 206 may further store a metric-collection component 212 configured to, when executed by the processor(s) 202, collect the health values 230 and/or other metric values from the agents 128 executing on the instances 126. The configuration-data component 216 may be configured to periodically, continuously, etc., collect the health values 230 to provide to a configuration-data component 216 stored in the computer-readable media 206. The configuration-data component 216 may be configured to, when executed by the processor(s) 202, generate updated configuration data 146 and/or initial configuration data 228. The configuration-data component 216 may generate the initial configuration data 134 based on input received from a developer 110, and/or based on configuration data for other developers 110. For instance, the configuration-data component 216 may identify another fleet of instances 126 for a similar type game, and utilize the configuration data 134 from those instances 126 to determine initial configuration data 134 for a new fleet of instances 126. The configuration-data component 216 may be configured to generate the updated configuration data 146 using various techniques, such as those described above.

The computer-readable media 206 may further store a monitoring component 218 that, when executed by the processor(s) 202, collects information for a game session and logs them in a storage location for a developer 110. For instance, the monitoring component 218 may identify and collect metrics for game sessions hosted on an instance 126, such as length of the game sessions, players involved, type of game, events occurring in the game, hardware utilization metrics, players leaving and/or entering the game, and/or various other metadata for a game session that may be of interest to a developer 110.

The computer-readable media 206 may further store a machine-learning (ML) component 220 that, when executed by the processor(s) 202, trains one or more ML models that are usable to determine the updated configuration data 146. For example, the ML component 220 may analyze data from fleets of instances 126, such as health values 144 obtained over time and corresponding numbers of processes 132 that were executing when the health values 144 were obtained. The ML component 220 may generate ML models that determine the updated configuration data 146 for instances 126 that define maximum numbers of processes 132 that may concurrently execute to help ensure that the health values 144 do not go over a threshold associated with unhealthy processes 132. State otherwise, the ML models may be trained to identify, based on health values 144 obtained overtime, that updated configuration data 146 needs to be generated because health values 144 are trending towards unhealthy based on learned patterns, or because health values 144 are trending towards an indication of underutilized resources supporting the instances 126.

The computer-readable media 206 may further store an auto-scaling component 222 that, when executed by the processor(s) 202, scales up or down the number of instances 126 available to host game sessions or other processes 132. For example, the auto-scaling component 222 may provide a fast, efficient, and accurate way to match fleet capacity to player usage. In some examples, the auto-scaling component 222 may track the fleet's hosting metrics and determine when to add or remove instances 126 based on a set of guidelines, called policies, that may be defined by the developer 110. The auto-scaling component 222 can adjust capacity in response to changes in player demand to help ensure that the fleet of instances 126 has availability for new players without maintaining an excessive amount of idle resources.

To utilize the services provided by the service provider network 102, clients 112 and developers 110 may register for an account with the service provider network 102. For instance, clients 112 and developers 110 may utilize a device to interact with an identity and access management (IAM) component 224 that allows the clients 112 and developers 110 to create an account with the service provider network 102. Generally, the IAM component 224 may enable the clients 112 and developers 110 to manage access to their cloud-based services and computing resources securely. Using the IAM component 224, the developers 110 may manage their game builds 118 and/or fleets of instances 126 as described herein. Additionally, clients 112 may interact with their account to, for example, change settings for their gaming experience, management payments, and/or other functions.

The service provider network 102 may further store one or more data stores 226 (e.g., object storage) that stores various data described herein at one or more locations in the service provider network 102. The data store 226 may include the game builds 118 for developers 110 that include game software 130 and initial configuration data 228, along with other data described herein. The data store 226 may further store the health values 144 for processes 132, updated configuration data 146 that has been generated for instances 126, the queues 230 in which new player groups or game groups are queued before being placed into instances 126, user accounts 232 for the clients 112 and/or developers 110, and ML models 234 to analyze various data (e.g., health values 144, threshold values, etc.) and generated updated configuration data 146 defining new permissible limits for numbers of concurrently executing processes 132.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service-provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3A:
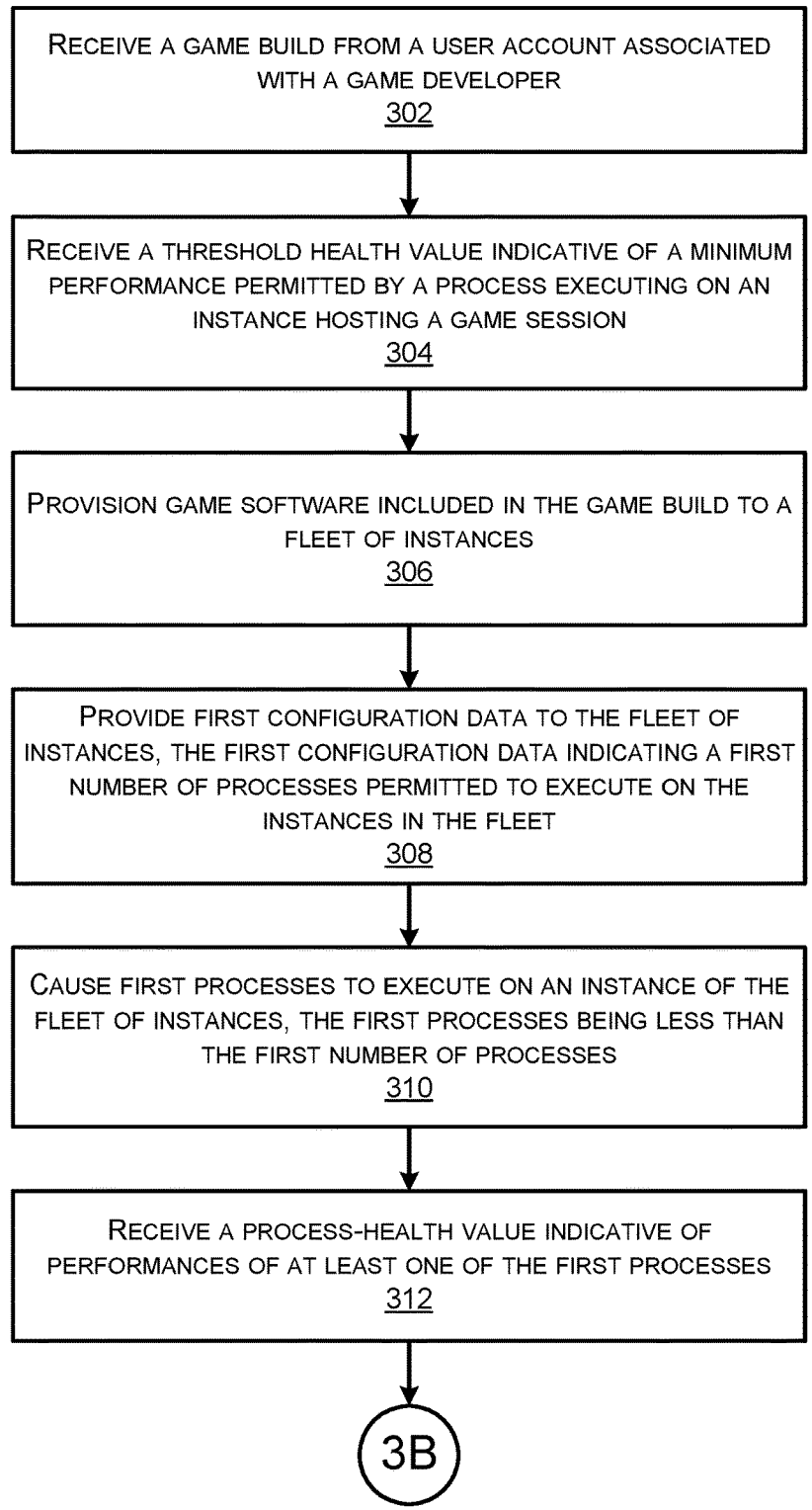
FIGS. 3A and 3B illustrate a flow diagram of an example method for dynamically modifying the number of processes that are permitted to concurrently execute on an instance.
Figure 3B:
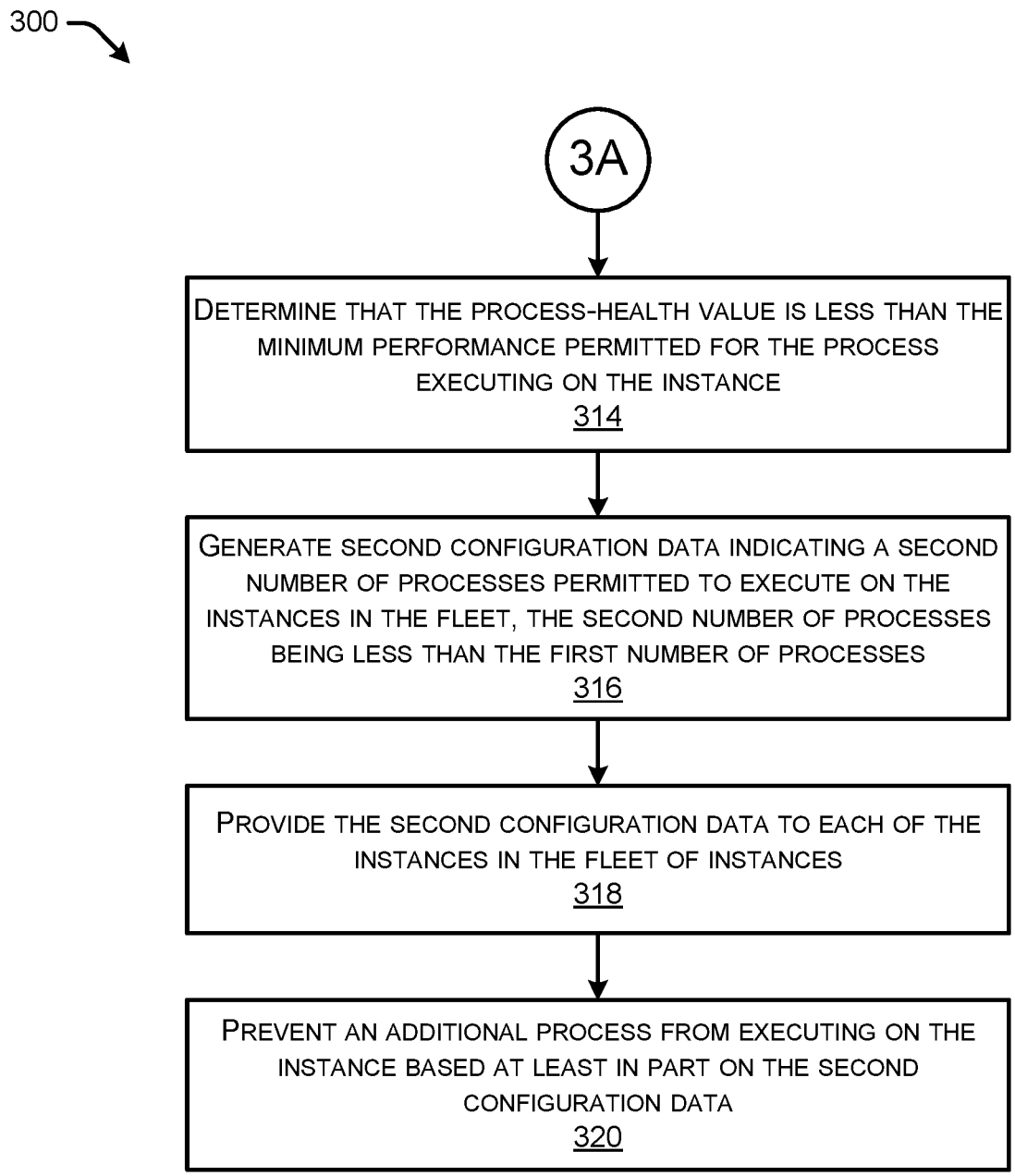

FIGS. 3A and 3B illustrate a flow diagram of example method 300 that illustrates aspects of the functions performed at least partly by the network-based service platform 102 as described in FIGS. 1 and 2. The logical operations described herein with respect to FIGS. 3A and 3B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3A and 3B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 3A and 3B illustrate a flow diagram of an example method 300 for dynamically modifying the number of processes that are permitted to concurrently execute on an instance. In some examples, the method may be performed entirely by server(s) of a game-hosting service 106, an agent 128 operating locally on an instance 126, and/or a combination thereof.

At 302, a game-hosting service 106 may receive a game build 118 from a user 232 account associated with a game developer 110. For instance, the developer 110 may upload a game build 118 that includes game software 130 through a developer portal 116.

At 304, the game-hosting service 106 may receive a threshold health value indicative of a minimum performance permitted by a process 132 executing on an instance 126 hosting a game session using the game software 130. For instance, the developer 110 may provide a minimum threshold of 20 fps under which processes 132 are not allowed to execute.

At 306, the game-hosting service 106 may provision the game software 130 included in the game build 118 to a fleet of instances 126. For example, the game-hosting service 106 may spin up a fleet of instances 126 based on a developer's 110 request where each instance 126 in the fleet will execute at least one process 132 that hosts a game session.

At 308, the game-hosting service 106 may provide first configuration data 134 to the fleet of instances 126. In some examples, the first configuration data 134 may define a first number of processes 132 that are permitted to execute on the instances 126 in the fleet. The first configuration data 134 may be based input by the developer 110, in some examples. In other examples, the first configuration data 134 may be determined using ML model 234 generated using training data from other instances 126 that execute similar game software 130.

At 310, the game-hosting service 106 or the agent 128 may cause first processes to execute on an instance 126 of the fleet of instances 126 according to the first configuration data 134 such that the first processes 132 that execute concurrently are less than the first number of processes permitted to execute on the instance 126. In some examples, the instances 126 may be configured to dequeue workloads or game sessions from a queue 230 based on the number of processes being less than the first number of processes indicated in the first configuration data 134.

At 312, the game-hosting service 106 may receive a process-health value 144 indicative of performances of at least one of the first processes 132. For instance, the agent 128 may collect and send an indication of the frames per second metric for a process 132 that is hosting a game session using the game software 130.

At 314, the game-hosting service 106 may determine that the process-health value 144 is less than the minimum performance permitted for the process executing on the instance 126. For example, the process-health value 144 may indicate that the process 132 is executing at 18 fps, which is below the minimum performance and may indicate that clients 112 in the session are experiencing "lag" or otherwise an undesirable gaming session.

At 316, the game-hosting service 106 may generate second configuration data 146 indicating a second number of processes 132 permitted to execute on the instances 126 in the fleet. For instance, the second configuration data 146 may indicate the second number of processes are less than the first number of processes 132 to reduce the number of processes 132 concurrently executing, and raise the frame rate for each process by lessening the load on the CPU/GPU. In some examples, the game-hosting service 106 may iteratively increase the number of permitted processes and keep checking process-health values to identify a target number of processes that optimize resource utilization while maintaining healthy frame rates for the processes 132.

At 318, the game-hosting service 106 may provide the second configuration data 146 to each of the instances 126 in the fleet of instances 126. For example, the second configuration data 146 may be appropriate for each instance 126 in examples where they are executing processes 132 that host the same game software 130.

At 320 the instance 126 and/or agent 128 may prevent an additional process 132 from executing on the instance 126 based at least in part on the second configuration data 146 specifying the second number of processes that are less than the first processes concurrently executing on the instance 126.

FIG. 4 illustrates a graphical user interface 400 by which a game developer can specify parameters to create a fleet of instances 126 that support a game build 118. The developer 110 may have created a developer profile or account 232 with the service provider network 102 and access the user interface 400 via a developer portal 116.

The developer user interface 400 may include a fleet details portion 402 through which the developer 110 may specify details for their fleet of instances 126 that are hosting a game build 118 of the developer 110. As illustrated, the developer 110 may use the fleet details portion 402 to specify a name of the fleet of instances 126, a description of the fleet, and a fleet type.

Additionally, the fleet details portion 402 may include a metric group option where the developer 110 may specify a metric, such as a performance metric, that they wish to monitor or restrict for processes 132 executing on the instances 126. Although illustrated as frames per second metric, the metric may generally comprise any computing resource metric indicative of resource utilization and/or process 132 performance. Further, the fleet details portion 402 may allow the developer 110 to input a health metric minimum (and potentially a maximum) indicating a lower threshold that the developer 110 does not want their processes 132 to fall below. As indicated, the developer 110 of this game build 118 does not wish for processes 132 that are hosting a game session to fall below 20 fps. The game developer 110 may select the health metric min 406 based on various factors. For example, a slower paced game (e.g., virtual board game) may have a lower health metric minimum 406, such as 10 fps, but a faster paced game (e.g., action game, first person shooter, etc.) may have a higher health metric minimum (e.g., 40 fps). The developer 110 may select the health metric minimum 406 based on the game performance that is appropriate for their game guild 118, and also by balancing resource utilization with game performance.

The user interface 400 may further allow a developer 110 to specify additional, optional metric groups 408 for their VM instances 126. For example, the developer 110 may indicate that they would like to specify an additional health metric minimum 408 indicating another resource-based lower threshold that the developer 110 does not want their instances 126 to fall below. For example, the developer 110 may desire that their instances 126 have a particular amount of memory availability, and specify a health metric minimum 410 of 20 percent indicating that the instances 126 maintain 20 percent of the memory available. In this way, the developer 110 may specify additional metrics associated with their instances 126.

Once the developer 110 has finished inputting the data for their game build 118, they may save they properties or configuration data. The user interface 400 is merely illustrative with respective to how a developer 110 may provide game build 118 properties or configuration data, and any other interface or portal may be utilized to receive the same properties, or different properties, then those shown.

Figure 5:
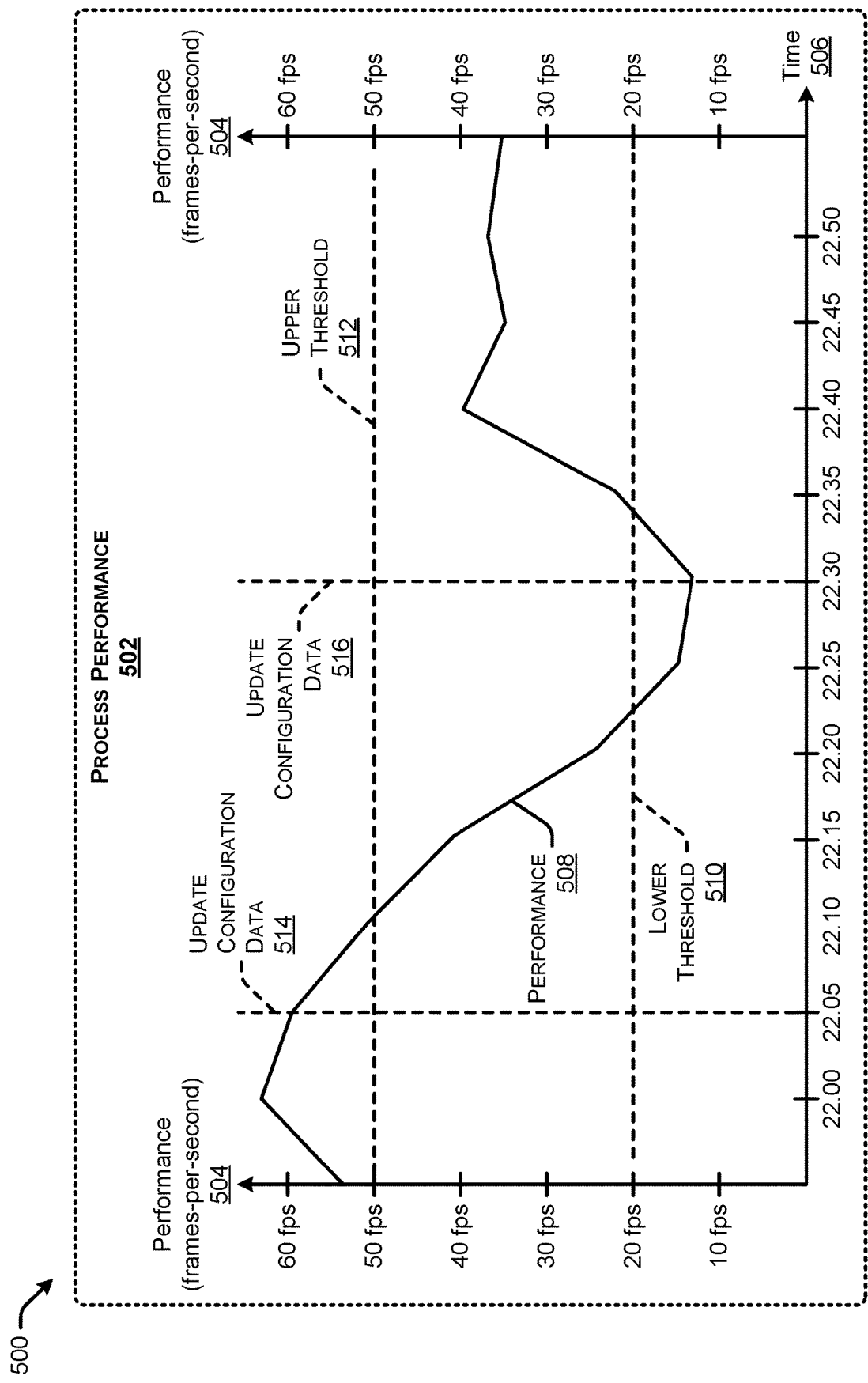
FIG. 5 illustrates an example graph illustrating the performance of one or more processes executing on an instance as configuration data changes for the instance over time.

FIG. 5 illustrates an example graph 500 illustrating the process performance 502 of one or more processes 132 executing on an instance 126 as configuration data 134 changes for the instance 126 over time.

As illustrated, the process performance 502 may be plotted on a graph 500 based on the performance 504 (in this example, frames-per-second) over time 506. The performance curve 508 may illustrate the performance of one or more processes 132 on an instance 126 as the configuration data 134 is changed for that instance 126. The performance of the process(es) 132 may begin around 55-60 fps, which is above an upper threshold 512 that is set at 50 fps. This upper threshold 512 may indicate that the instance 126 on which the process(es) 132 are executing is underutilized. The game-hosting service 106 may update the configuration data at 514 to allow more process(es) 132 to execute concurrently on the instance 126. The performance 508 may begin to lower such that it passes below a lower threshold 510. The lower threshold 510 may indicate performance that a developer 110 does not wish for their game sessions to drop below, in this case 20 fps. Accordingly, the game-hosting service 106 may update the configuration data 516 a second time to prevent the instance 126 from executing additional process(es) 132 such that, as process(es) 132 are terminated or completed, the instance 126 executes less process(es) 132 than previously permitted by the updated configuration data at 514.

The graph 500 is merely one illustrative example of how the game-hosting service may dynamically modify the number of process(es) 132 that are permitted to execute on an instance 126 concurrently based on lower and/or upper threshold values for process performance.

Figure 6:
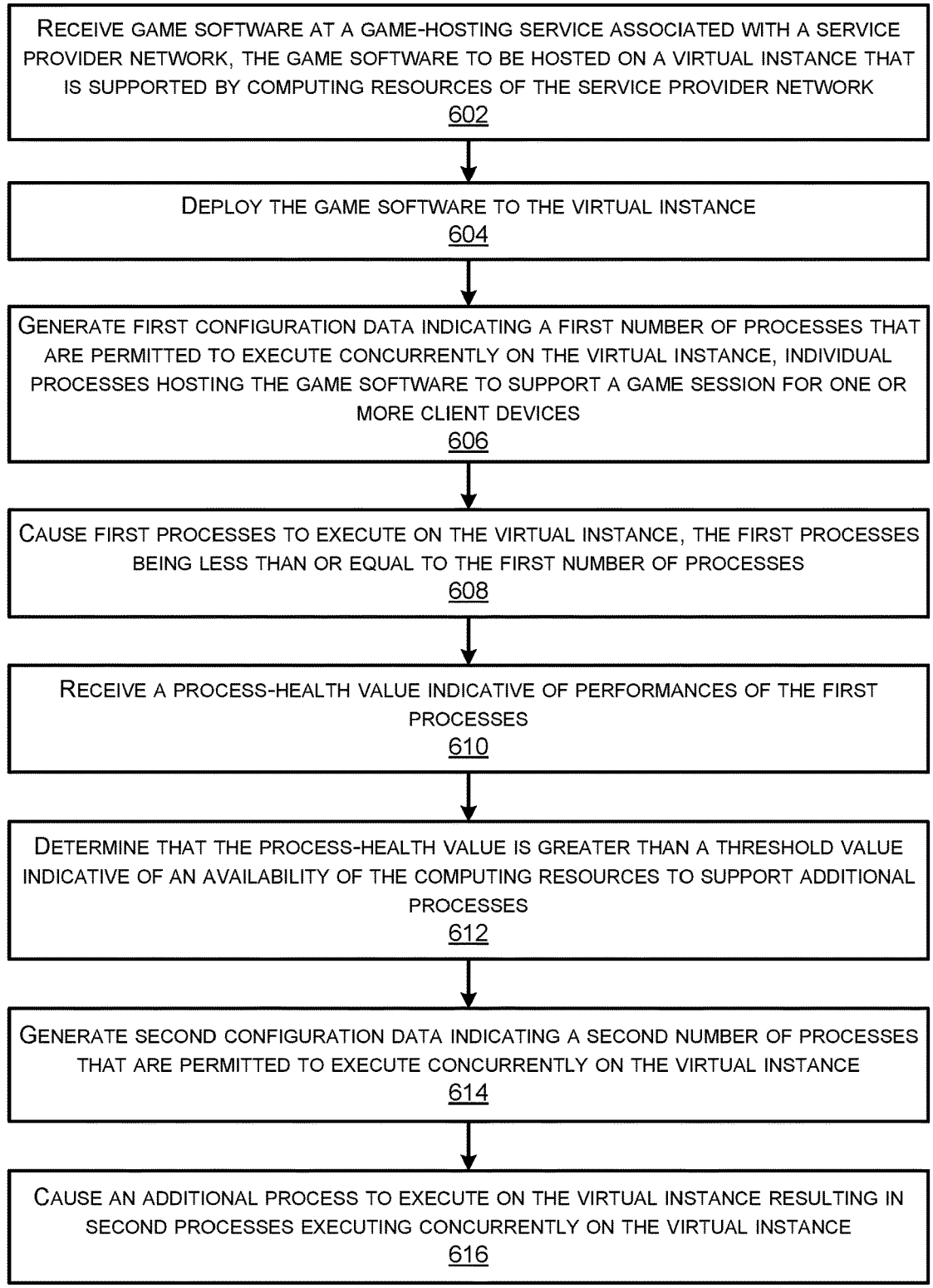
FIG. 6 illustrates a flow diagram of an example method for dynamically increasing the number of processes that are permitted to concurrently execute on an instance.
Figure 7:
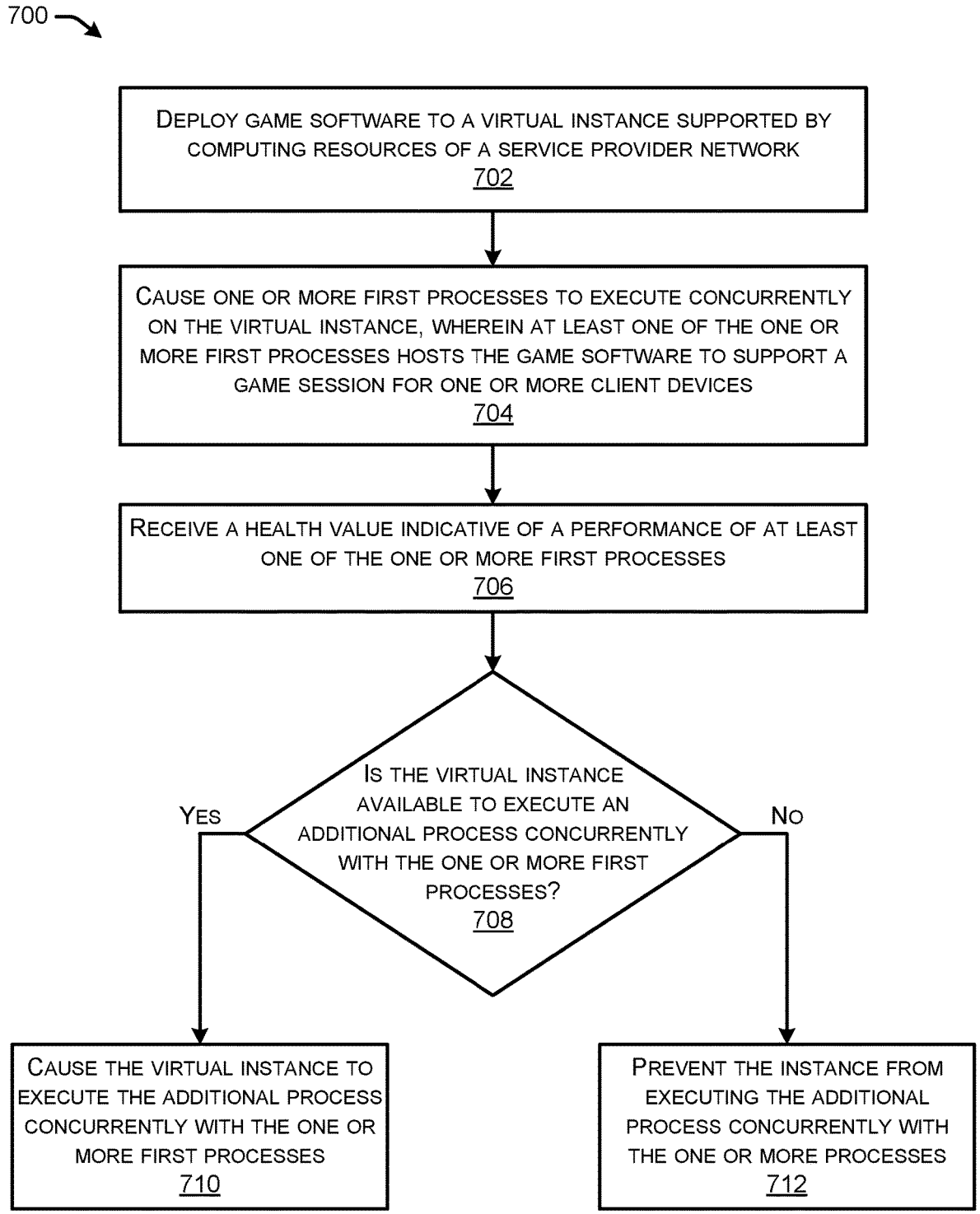
FIG. 7 illustrates a flow diagram of an example method for dynamically determining whether to increase or decrease the number of processes that are permitted to concurrently execute on an instance.

FIGS. 6 and 7 illustrate flow diagrams of example methods 600 and 700 that illustrate aspects of the functions performed at least partly by the service provider network 102 as described in FIGS. 1-5. The logical operations described herein with respect to FIGS. 6 and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6 and 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 illustrates a flow diagram of an example method 600 for dynamically increasing the number of processes 132 that are permitted to concurrently execute on an instance 126.

At 602, a game-hosting service 106 may receive game software 130 that is to be hosted on a virtual instance 126 that is supported by computing resources of a service provider network 102.

At 604, the game-hosting service 106 may deploy the game software 130 to the virtual instance 126. In various examples, the game-hosting service 106 may deploy the game software 130 to a fleet of virtual instances 126 supported by the computing resources of the service provider network 106.

At 606, the game-hosting service 106 may generate first configuration data 134 indicating a first number of process(es) 132 that are permitted to execute concurrently on the virtual instance 126. In some examples, individual processes 132 host the game software 130 to support a game session for one or more client devices 114 that have established a game connection 136.

At 608, the game-hosting service 106 may cause first process(es) 132 to execute on the virtual instance 126 where the first processes are less than or equal to the first number of process(es) 132. In some instances, 608 may be performed by an agent 128 and/or other programs running on the instance 126.

At 610, the game-hosting service 106 may receive a process-health value 144 indicative of performance of the first process(es) 132. In some instances, the process-health value 144 may indicate a frame rate associated with hosting the game software 130 to support the game session for the client devices 114.

At 612, the game-hosting service 106 may determine that the process-health value 144 is greater than a threshold value indicative of an availability of the computing resources to support additional processes 132. In examples where the process-health value 144 is a frame rate associated with hosting the game software 130, the threshold value may indicate a minimum acceptable frame rate defined by a service level agreement (SLA) associated with a developer account for the game software. In such examples, the determining that the virtual instance 126 is capable of executing the additional process 132 concurrently with the first processes 132 comprises determining that the process-health value 144 is greater than or equal to the threshold value.

At 614, the game-hosting service 106 may, based on the process-health value 144 being greater than the threshold value, generate second configuration data 146 indicating a second number of processes that are permitted to execute concurrently on the virtual instance 126. In such examples, the second number of processes being greater than the first number of processes.

In some examples, the game-hosting service 106 may provide the fleet of virtual instances 126 with the second configuration data 146 such that individual virtual instances 126 of the fleet of virtual instances 126 execute no more than the second number of processes.

At 616, the game-hosting service 106, and/or the agent 128, may cause an additional process 132 to execute on the virtual instance 126 resulting in second processes 132 executing concurrently on the virtual instance 126.

In some instances, the method 600 may further include receiving a second process-health value indicative of performances of the second processes, and determining that the second process-health value is less than or equal to a second threshold value. Further, the method 600 may include generating third configuration data indicating a third number of processes that are permitted to execute concurrently on the virtual instance, the third number of processes being less than the second number of processes.

FIG. 7 illustrates a flow diagram 700 of an example method for dynamically determining whether to increase or decrease the number of processes 132 that are permitted to concurrently execute on an instance 126.

At 702, a game-hosting service 106 may deploy game software 130 to a virtual instance 126 supported by computing resources of a service provider network 102. At 704, the game-hosting service 106, an agent 128, and/or the instance 126 may cause one or more first processes 128 to execute concurrently on the virtual instance 126. In such examples, at least one of the one or more first processes 132 hosts the game software 130 to support a game session for one or more client devices 114.

At 706, the game-hosting service 106 may receive a health value 144 indicative of a performance of at least one of the one or more first processes 132. For instance, the agent 128 may collect performance data 142 from the process(es) 132 and report the health value 144 to the game-hosting service 106.

At 708, the game-hosting service 106 may determine, based at least in part on the health value 144 and a threshold health value, whether the virtual instance 126 is available to execute an additional process concurrently with the one or more first processes 132. For instance, if the health value 144 indicates that the process(es) 132 are healthy, the virtual instance 126 may be available to execute an additional process 132. Alternatively, if the health value 144 and the threshold value indicate that the process(es) 132 is unhealthy, the virtual instance 126 may be unavailable to execute an additional process 132.

At 710, if the game-hosting service 106 determines that the process(es) 132 are available to execute the additional process 132, the game-hosting service 106 (and/or agent 128) may cause the virtual instance 128 to execute the additional process 132 concurrently with the one or more first processes 132 to result in second processes 132 being executed concurrently on the virtual instance 126. For instance, the virtual instance 126 may be provided with updated configuration data 146 that permits the instance 126 to concurrently execute additional processes 132.

Alternatively, if the game-hosting service 106 determines that the process(es) 132 are unavailable to execute the additional process 132, the game-hosting service 106 (and/or agent 128) may prevent the virtual instance 128 from executing the additional process 132 concurrently with the one or more first processes 132. For instance, the virtual instance 126 may be provided with updated configuration data 146 that restricts the amount of processes 132 that are permitted to be concurrently executed to less than the previous configuration data.

Figure 8:
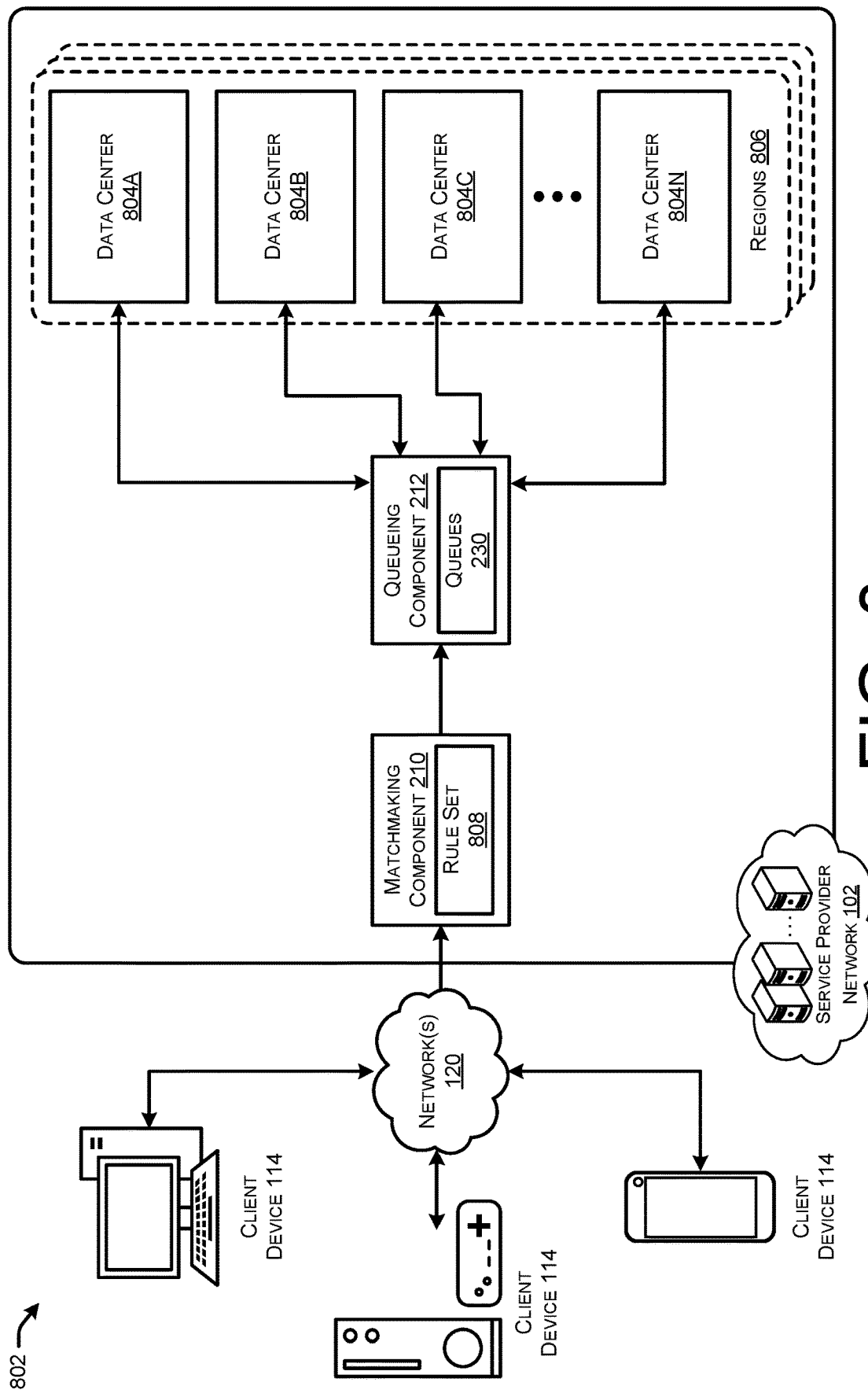
FIG. 8 is a system and network diagram that shows an illustrative operating environment that includes a service provider network that can be configured to implement aspects of the functionality described herein.

FIG. 8 is a system and network diagram that shows an illustrative operating environment that includes a service provider network 102 that can be configured to implement aspects of the functionality described herein. The service provider network 102 can provide computing resources, like VM instances and storage, on a permanent or an as-needed basis. Among other types of functionality, the computing resources 122 provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 804A-804N (which might be referred to herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 can also be located in geographically disparate locations, or regions 806. One illustrative embodiment for a data center 804 that can be utilized to implement the technologies disclosed herein will be described below with regard to FIG. 9.

The clients 110 and developers 110 that utilize the service provider network 102 may access the computing resources provided by the service provider network 102 over any wired and/or wireless network(s) 120, which can be a wide area communication network ("WAN"), such as the Internet, an intranet or an Internet service provider ("ISP") network or a combination of such networks. For example, and without limitation, a client device 114 operated by a client 12 of the service provider network 102 may be utilized to access the service provider network 102 by way of the network(s) 120. It should be appreciated that a local-area network ("LAN"), the Internet, or any other networking topology known in the art that connects the data centers 804 to remote clients and other users can be utilized. It should also be appreciated that combinations of such networks can also be utilized.

As illustrated, the client devices 114 may be placed into a game session group or player group by the matchmaking component 210. The matchmaking component 210 may include a rule set 808 that groups clients 112 based on various factors, such as location, game preferences, experience or skill of the clients 112, and/or other factors. The matchmaking component 210 may then route the player groups into a queueing component 212 which places the player groups into queues 230 based on, for example, the geographic region 806 of the client devices 114. For example, the queues 230 may place player groups located in certain geographic regions 806 into queues such that the game sessions for those player groups are instantiated, created, or otherwise hosted by a VM instance 126 on a server located in a data center 804 in the same geographic region 806 (or geographically proximate or near) as the client devices 114. In this way, network latency may be reduced by having game sessions hosted on instances 126 in data centers 804 in a near data center 804 to the client devices 114.

Figure 9:
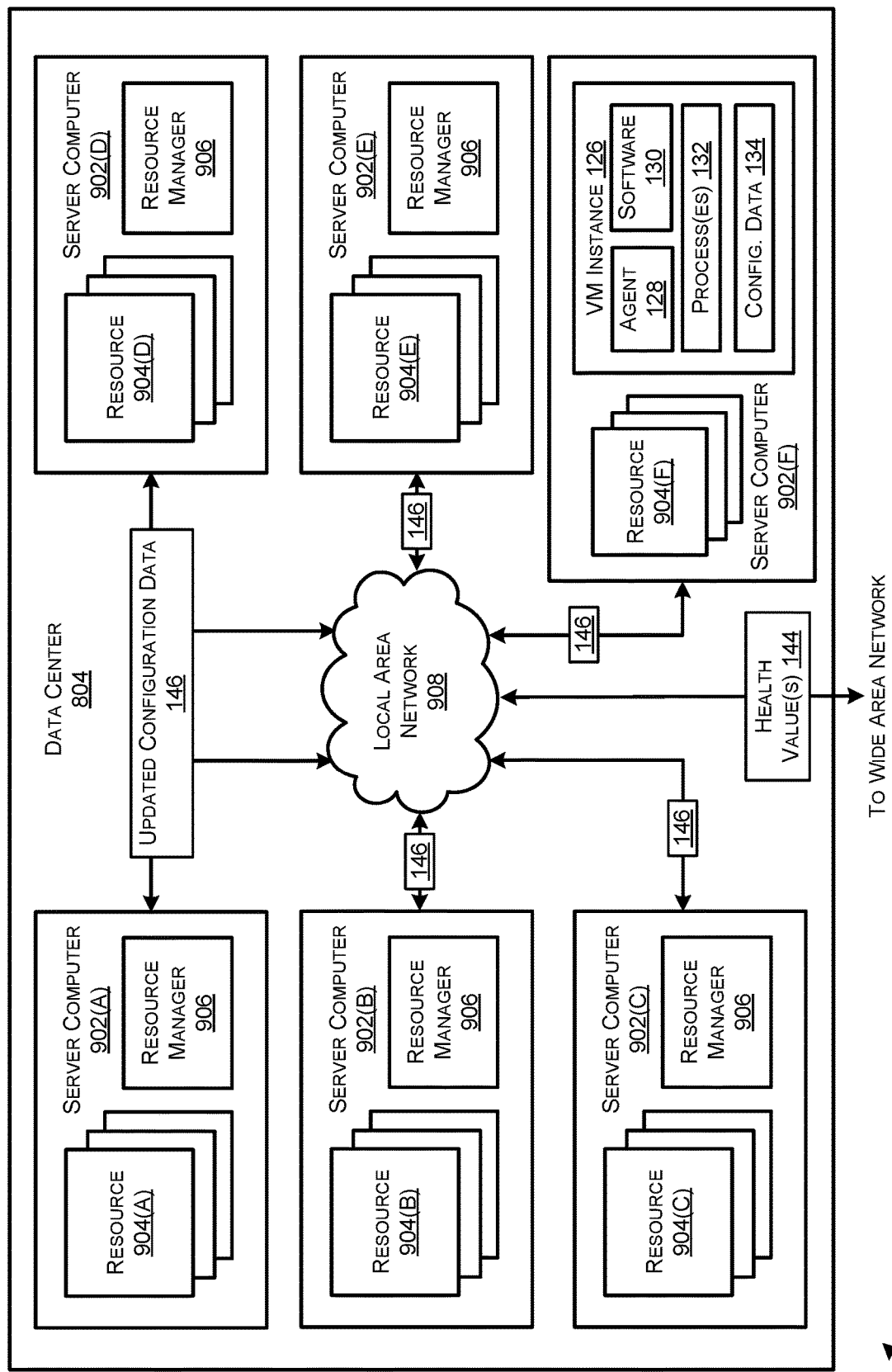
FIG. 9 is a computing system diagram illustrating a configuration for a data center that can be utilized to implement aspects of the technologies disclosed herein.

FIG. 9 is a computing system diagram 900 that illustrates one configuration for a data center 804 that implements aspects of the technologies disclosed herein. The example data center 804 shown in FIG. 9 includes several server computers 902A-902F (which might be referred to herein singularly as "a server computer 902" or in the plural as "the server computers 902") for providing computing resources 904A-904E. In some examples, the resources 904 and/or server computers 902 may include, be included in, or correspond to, the computing resource network 122 described herein.

The server computers 902 can be standard tower, rack-mount, or blade server computers configured appropriately for providing the computing resources described herein (illustrated in FIG. 9 as the computing resources 904A-904E). As mentioned above, the computing resources provided by the service provider network 102 can be data processing resources such as VM instances or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 804 can also be configured to provide network services and other types of services.

In the example data center 804 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804A-804N, between each of the server computers 902A-902F in each data center 804, and, potentially, between computing resources in each of the server computers 902. It should be appreciated that the configuration of the data center 804 described with reference to FIG. 9 is merely illustrative and that other implementations can be utilized.

The data center 804 shown in FIG. 9 also includes a server computer 902F that can execute some or all of the software components described above. For example, and without limitation, the server computer 902F (and the other server computers 902) can generally correspond to the game servers 124 of FIG. 1 and be configured to execute components of the virtual instance 126 executing thereon, including the agent 128 (which may correspond to a resource manager 906), the process(es) 132, and/or the other software components described above. Additionally, the server computing 902F may store the configuration data 134 and software 130 of the game build 118. The server computer 902F can also be configured to execute other components and/or to store data for providing some or all of the functionality described herein. In this regard, it should be appreciated that the services illustrated in FIG. 9 as executing on the server computer 902F can execute on many other physical or virtual servers in the data centers 904 in various embodiments.

In some examples, the agent 128 on the VM instance 126, and/or the resource managers 906 on the other server computers 902, may collect health values 144 for the process(es) 132 hosting game sessions and send the health values 144 over a wide area network to, for example, the game-hosting service 106. Further, the server computers 902 may receive, based on the health values 144 reported to the game-hosting service 106, updated configuration data 146 to dynamically modify the number of process(s) 132 that are permitted to concurrently execute on the instances 126 of the servers. Thus, the data center 804 in FIG. 9 is an illustrative example of a plurality of server computers 902 that may be executing a fleet of VM instances 126 are executing processes concurrently based on dynamically modified configuration data 146 to host game sessions for online games.

Figure 10:
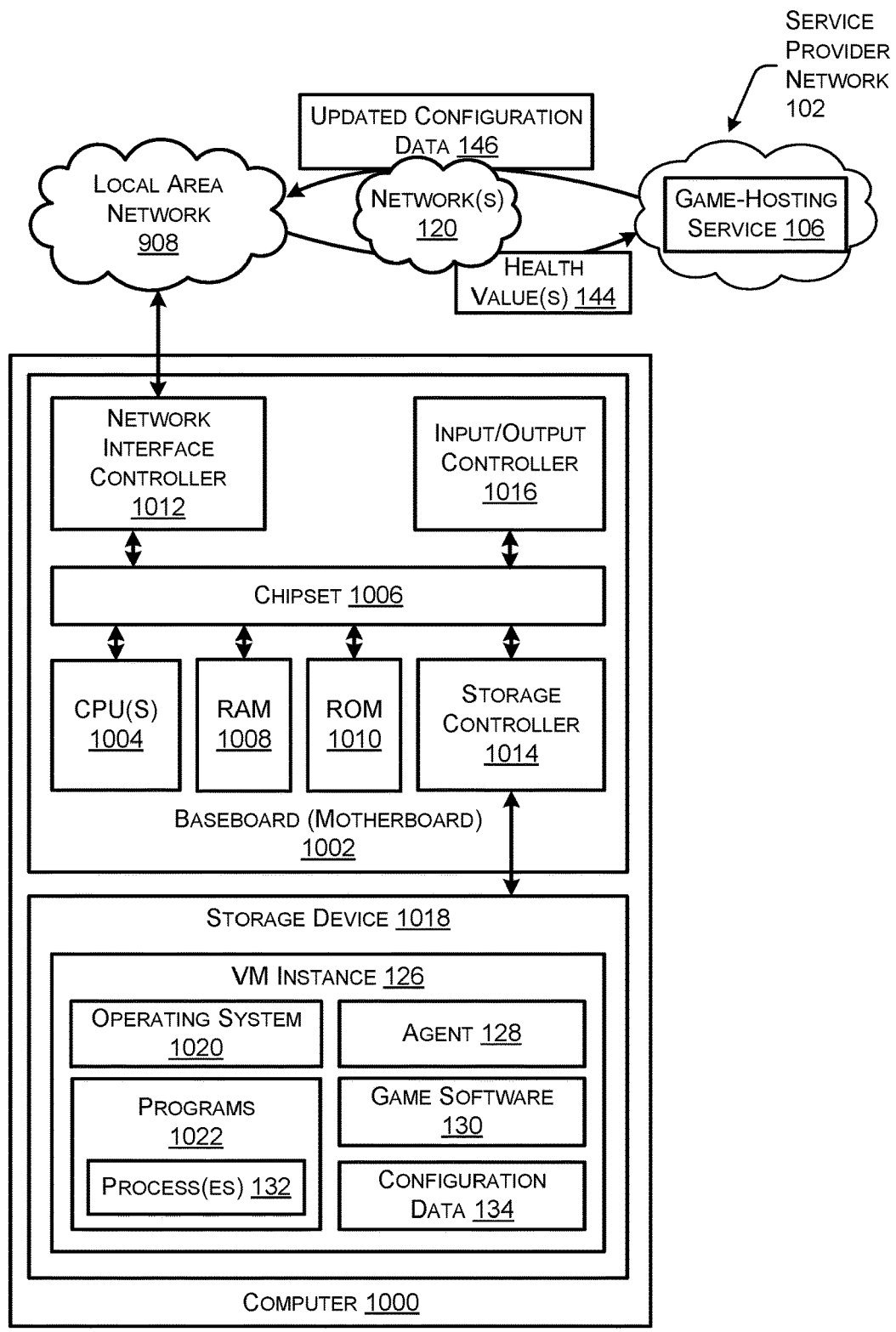
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. In some examples, the server computer 1000 may correspond to, or be the same as or similar to, a game server 124 described in FIG. 1.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 908. The chipset 1006 can include functionality for providing network connectivity through a NIC 1012, such as a gigabit Ethernet adapter. The NIC 1012 is capable of connecting the computer 1000 to other computing devices over the network 908 (or 120). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022 (e.g., processes 132, agent 128, etc.), and data, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the network-based service platform 102, and or any components included therein, may be supported by one or more devices similar to computer 1000. Stated otherwise, some or all of the operations performed by the service provider network 102, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-7. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

As shown in FIG. 10, the VM instance 126 may be executing process(es) 132 to host a game session where the number of process(es) 132 being concurrently executed on the computer 1000 is less than a permissible number specified in the configuration data 134. In some examples, the agent 128 operating on the VM instance 126 that is executing on the computer 1000 may collect and report/send health value(s) 144 over networks 908 and/or 120 to the game-hosting service 106. The game-hosting service 106 may then generate updated configuration data 146 that is sent back to the computer 1000 and provided to the VM instance 126. The VM instance 126 may then allow, or prevent, additional process(es) 132 to execute to host game sessions based on the updated configuration data 146.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
   receiving game software at a game-hosting service associated with a service provider network, the game software to be hosted on a virtual instance that is supported by computing resources of the service provider network;
   deploying the game software to the virtual instance;
   generating first configuration data indicating a first number of processes that are permitted to execute concurrently on the virtual instance, individual processes of the first number of processes hosting the game software to support a game session for one or more client devices;

causing first processes to execute on the virtual instance, the first processes being less than or equal to the first number of processes;
receiving a process-health value indicative of performances of the first processes;
determining, based on the process-health value and a threshold value, that there is an availability of the computing resources to support an additional process;
based on the availability of the computing resources to support the additional process:
generating second configuration data indicating a second number of processes that are permitted to execute concurrently on the virtual instance, the second number of processes being greater than the first number of processes; and
causing the additional process to execute on the virtual instance resulting in second processes executing concurrently on the virtual instance, the second processes being less than or equal to the second number of processes.

2. The computer-implemented method of claim 1, wherein the process-health value comprises a first process-health value, and the threshold value comprises a first threshold value,
further comprising, subsequent to causing the additional process to execute:
receiving a second process-health value indicative of second performances of the second processes;
determining, based on that the second process-health value and a second threshold value, that the virtual instance is unavailable to execute an additional process; and
causing another virtual instance to execute the additional process.

3. The computer-implemented method of claim 1, further comprising:
deploying the game software to a fleet of virtual instances supported by the computing resources of the service provider network; and
providing the fleet of virtual instances with the second configuration data such that individual virtual instances of the fleet of virtual instances execute a third number of processes that are less than or equal to the second number of processes.

4. The computer-implemented method of claim 1, wherein the process-health value comprises a first process-health value, and the threshold value comprises a first threshold value,
further comprising:
receiving a second process-health value indicative of second performances of the second processes;
determining that the second process-health value is less than or equal to a second threshold value; and
generating third configuration data indicating a third number of processes that are permitted to execute concurrently on the virtual instance, the third number of processes being less than the second number of processes.

5. A system comprising:
one or more processors; and
one or more computer-readable media storing computer-executable instructions that, when executed by the one or more processors, cause the one or more processors to perform operations comprising:
deploying software to a virtual instance supported by computing resources of a service provider network;
generating first configuration data indicating a first number of processes that are permitted to execute concurrently on the virtual instance;
causing one or more first processes to execute concurrently on the virtual instance, wherein at least one of the one or more first processes hosts the software to support a session for one or more client devices, the one or more first processes being less than or equal to the first number of processes;
receiving a value indicative of a performance of at least one of the one or more first processes;
determining, based at least in part on the value and a threshold value, that the virtual instance is available to execute an additional process concurrently with the one or more first processes;
based at least in part on determining that the virtual instance is available to execute the additional process concurrently with the one or more first processes, generating second configuration data indicating a second number of processes that are permitted to execute concurrently on the virtual instance, the second number of processes being greater than the first number of processes; and
causing the virtual instance to execute the additional process concurrently with the one or more first processes to result in second processes being executed concurrently on the virtual instance the second processes being less than or equal to the second number of processes.

6. The system of claim 5, the operations further comprising:
receiving, at a hosting service associated with the service provider network, a server build including the software, wherein the server build is associated with a developer account of the service provider network; and
determining the threshold value based at least in part on a service level agreement (SLA) associated with the developer account.

7. The system of claim 5, wherein the virtual instance comprises a first virtual instance, the value comprises a first value, the operations further comprising:
receiving a second value indicative of a second performance of third processes executing on a second virtual instance, wherein at least one of the third processes hosts the software;
determining, based at least in part on the second value and the threshold value, that the second virtual instance is available to execute a second additional process concurrently with the third processes;
generating third configuration data indicating a third number of processes that are permitted to execute concurrently on the second virtual instance, the third number of processes being different than the second number of processes; and
providing the second virtual instance with the third configuration data.

8. The system of claim 5, the operations further comprising:
providing the second configuration data indicating the second number of processes to a fleet of virtual instances on which the software is deployed.

9. The system of claim 5, wherein:
the value comprises a first value; and
determining that the virtual instance is available to execute the additional process comprises determining that the first value is greater than or equal to the threshold value;

the operations further comprising:
receiving a second value indicative of a second performance of at least one of the second processes;
determining that the second value is greater than the threshold value;
analyzing at least the first value and the second value with a machine-learning model to determine a number of processes that are permitted to execute concurrently on the virtual instance;
generating configuration data indicating the number of processes that are permitted to execute concurrently on the virtual instance; and
providing the configuration data to the virtual instance.

10. The system of claim 5, wherein:
the value indicates a frame rate associated with hosting the software to support the session for the one or more client devices;
the threshold value indicates a minimum acceptable frame rate defined by a service level agreement (SLA) associated with a developer account for the software; and
determining that the virtual instance is capable of executing the additional process concurrently with the one or more first processes comprises determining that the value is greater than or equal to the threshold value.

11. The system of claim 5, the operations further comprising:
deploying a local agent to the virtual instance;
collecting, by the local agent, performance data for the at least one of the one or more first processes, the performance data being indicative of the value; and
sending, by the local agent and to a hosting service associated with the service provider network, the value.

12. A system comprising:
one or more processors; and
one or more computer-readable media storing computer-executable instructions that, when executed by the one or more processors, cause the one or more processors to perform operations comprising:
deploying software to an instance supported by computing resources of a service provider network;
generating first configuration data indicating a first number of processes that are permitted to execute concurrently on the instance;
providing the instance with the first configuration data such that one or more first processes execute concurrently on the instance, wherein at least one of the one or more first processes hosts the software to support a session for one or more client devices;
receiving a value indicative of a performance of the at least one of the one or more first processes, the one or more first processes being less than or equal to the first number of processes;
determining, based at least in part on the value and a threshold value, that there is an availability of the computing resources to support an additional process;
based on the availability of the computing resources to support the additional process:
generating second configuration data indicating a second number of processes that are permitted to execute concurrently on the instance, the second number of processes being greater than the first number of processes; and
providing the second configuration data to the instance such that the additional process executes on the instance resulting in second processes executing concurrently on the instance, the second processes being less than or equal to the second number of processes.

13. The system of claim 12, wherein:
the value indicates a frame rate associated with hosting the software to support the session for the one or more client devices;
the threshold value indicates a minimum acceptable frame rate defined by a service level agreement (SLA) associated with a developer account for the software; and
determining that the instance is available to execute the additional process concurrently with the one or more first processes comprises determining that the value is greater than or equal to the threshold value.

14. The system of claim 12, the operations further comprising:
receiving, at a hosting service associated with the service provider network, a server build including the software, wherein the server build is associated with a developer account of the service provider network; and
determining the threshold value based at least in part on a service level agreement (SLA) associated with the developer account.

15. The system of claim 12, wherein the instance comprises a first instance, the value comprises a first value, the operations further comprising:
receiving a second value indicative of a second performance of second processes executing on a second instance, wherein at least one of the second processes hosts the software;
determining, based at least in part on the second value and the threshold value, that the second instance is available to execute an additional process concurrently with the second processes;
generating third configuration data indicating a third number of processes that are permitted to execute concurrently on the second instance, the third number of processes being different than the second number of processes; and
providing the second instance with the third configuration data.

16. The system of claim 12, the operations further comprising:
deploying the software to a fleet of instances supported by the computing resources of the service provider network; and
providing the fleet of instances with the second configuration data such that individual instances of the fleet of instances execute less than or equal to the second number of processes.

17. The system of claim 12, the operations further comprising:
deploying a local agent to the instance;
collecting, by the local agent, performance data for the at least one of the one or more first processes, the performance data being indicative of the value; and
sending, by the local agent and to a hosting service associated with the service provider network, the value.

18. The system of claim 12, wherein the value comprises a first value received at a first time, the operations further comprising:
receiving, at a second time, a second value indicative of a second performance of one or more second processes executing concurrently on the instance;

analyzing at least the first value and the second value with a machine-learning model to determine a number of processes that are permitted to execute concurrently on the instance;

generating configuration data indicating the number of processes that are permitted to execute concurrently on the instance; and providing the configuration data to the instance.

* * * * *